(12) United States Patent
Yuang et al.

(10) Patent No.: US 9,999,098 B2
(45) Date of Patent: Jun. 12, 2018

(54) BASE STATION AND SCHEDULING METHOD FOR WIRELESS NETWORK

(71) Applicant: Industrial Technology Research Institute, Hsinchu (TW)

(72) Inventors: Maria Chi-Jui Yuang, Hsinchu (TW); Po-Lung Tien, Hsinchu County (TW); Jen-Shun Yang, Hsinchu County (TW)

(73) Assignee: Industrial Technology Research Institute, Hsinchu (TW)

( * ) Notice: Subject to any disclaimer, the term of this patent is extended or adjusted under 35 U.S.C. 154(b) by 30 days.

(21) Appl. No.: 14/484,211

(22) Filed: Sep. 11, 2014

(65) Prior Publication Data
US 2015/0358988 A1 Dec. 10, 2015

(30) Foreign Application Priority Data
Jun. 6, 2014 (TW) .............................. 103119779 A

(51) Int. Cl.
| | |
|---|---|
| *H04W 88/10* | (2009.01) |
| *H04W 4/00* | (2018.01) |
| *H04W 28/22* | (2009.01) |
| *H04W 72/12* | (2009.01) |

(52) U.S. Cl.
CPC ............ *H04W 88/10* (2013.01); *H04W 4/00* (2013.01); *H04W 28/22* (2013.01); *H04W 72/12* (2013.01)

(58) Field of Classification Search
None
See application file for complete search history.

(56) References Cited

U.S. PATENT DOCUMENTS

| | | | |
|---|---|---|---|
| 7,062,556 B1 * | 6/2006 | Chen .................. | G06F 9/505 709/201 |
| 7,764,967 B2 | 7/2010 | Kim et al. | |
| 7,788,671 B2 | 8/2010 | Black-Ziegelbein et al. | |

(Continued)

FOREIGN PATENT DOCUMENTS

| | | |
|---|---|---|
| CN | 102143589 | 8/2011 |
| CN | 103379599 | 10/2013 |

(Continued)

OTHER PUBLICATIONS

Nie et al., "A Dynamic Channel Assignment Policy Through Q-Learning," IEEE Trans. Neural Networks, Nov. 1999, pp. 1443-1455.

(Continued)

*Primary Examiner* — Suk Jin Kang
(74) *Attorney, Agent, or Firm* — JCIPRNET

(57) ABSTRACT

A scheduling method for wireless network is provided. The scheduling method is executed by a base station and includes the steps of estimating a mean arrival rate of data to be transmitted through a first wireless network by a plurality of user equipments (UEs) through a second wireless network when the UEs are connected to the base station and in need of transmitting data through the first wireless network, determining a cluster size and dividing the UEs into a plurality of clusters according to the mean arrival rate, and notifying each UE the number of the clusters and the identification (ID) of the cluster accommodating the UE through the second wireless network. The number of the UEs in each cluster is not greater than the cluster size.

12 Claims, 8 Drawing Sheets

(56) References Cited

U.S. PATENT DOCUMENTS

| | | | |
|---|---|---|---|
| 7,835,320 B2 | 11/2010 | Magnusson et al. | |
| 7,965,676 B2 | 6/2011 | Dimou et al. | |
| 8,412,195 B2 | 4/2013 | Yuk et al. | |
| 2007/0070902 A1* | 3/2007 | Elaoud | H04L 12/5695 370/231 |
| 2008/0021988 A1* | 1/2008 | Abernethy | H04L 67/1008 709/223 |
| 2009/0213816 A1 | 8/2009 | Guo et al. | |
| 2009/0238090 A1* | 9/2009 | Sambhwani | H04W 28/16 370/252 |
| 2010/0014560 A1* | 1/2010 | Chong | H04B 1/71637 375/130 |
| 2010/0080179 A1* | 4/2010 | Santhanam | H04W 68/04 370/329 |
| 2010/0142458 A1* | 6/2010 | Mark | H04W 52/143 370/329 |
| 2010/0150002 A1* | 6/2010 | Kimble | H04L 41/065 370/252 |
| 2010/0246399 A1* | 9/2010 | Abraham | H04W 72/0453 370/235 |
| 2010/0248630 A1* | 9/2010 | Abraham | H04W 72/02 455/59 |
| 2010/0309779 A1* | 12/2010 | Amini | H04H 20/61 370/221 |
| 2010/0329198 A1* | 12/2010 | Madan | H04W 72/1242 370/329 |
| 2011/0130098 A1* | 6/2011 | Madan | H04W 24/02 455/63.1 |
| 2011/0130099 A1* | 6/2011 | Madan | H04W 72/1226 455/63.1 |
| 2012/0039308 A1* | 2/2012 | Kim | H04W 8/005 370/336 |
| 2012/0087348 A1* | 4/2012 | Wentink | H04W 74/006 370/336 |
| 2012/0113839 A1 | 5/2012 | Etemad | |
| 2012/0225662 A1* | 9/2012 | Jo | H04W 72/0486 455/447 |
| 2012/0289170 A1 | 11/2012 | Li et al. | |
| 2013/0016635 A1 | 1/2013 | Linsky et al. | |
| 2013/0029708 A1 | 1/2013 | Fox et al. | |
| 2013/0114464 A1* | 5/2013 | Tarraf | H04W 24/02 370/254 |
| 2013/0223421 A1 | 8/2013 | Gundavelli et al. | |
| 2013/0235773 A1 | 9/2013 | Wang et al. | |
| 2013/0272170 A1 | 10/2013 | Chatterjee et al. | |
| 2013/0272260 A1 | 10/2013 | Bitran et al. | |
| 2014/0044081 A1* | 2/2014 | Mark | H04W 52/143 370/329 |
| 2014/0071967 A1 | 3/2014 | Velasco | |
| 2014/0112262 A1 | 4/2014 | Mallik et al. | |
| 2014/0123168 A1 | 5/2014 | Reisman | |
| 2015/0296404 A1* | 10/2015 | Sharma | H04W 28/0215 370/230 |

FOREIGN PATENT DOCUMENTS

| | | |
|---|---|---|
| CN | 103517327 | 1/2014 |
| EP | 2723144 | 4/2014 |
| TW | 200807134 | 2/2008 |
| TW | 201110647 | 3/2011 |
| TW | 201349897 | 12/2013 |
| WO | 2011100447 | 8/2011 |
| WO | 2013126859 | 8/2013 |

OTHER PUBLICATIONS

Guo et al., "A Seamless and Proactive End-to-End Mobility Solution for Roaming Across Heterogeneous Wireless Networks," IEEE J. Selected Areas in Communications, Jun. 2004, pp. 834-848.

Lee et al., "A Framework of Handoffs in Wireless Overlay Networks Based on Mobile IPv6," IEEE J. Selected Areas in Communications, Nov. 2005, pp. 2118-2128.

Hasib et al., "Performance Analysis of Common Radio Resource Management Scheme in Multi-service Heterogeneous Wireless Networks," IEEE Wireless Communications and Networking Conference (WCNC), Mar. 11-15, 2007, pp. 3296-3300.

Bari et al., "Automated Network Selection in a Heterogeneous Wireless Network Environment," IEEE Network, Jan.-Feb. 2007, pp. 34-40.

Stevens-Navarro et al., "An MDP-Based Vertical Handoff Decision Algorithm for Heterogeneous Wireless Networks," IEEE Transactions on Vehicular Technology, Feb. 2008, pp. 1243-1254.

Xue et al., "Autonomic Joint Session Scheduling Strategies for Heterogeneous Wireless Networks," IEEE Wireless Communications and Networking Conference (WCNC), Mar. 31, 2008-Apr. 3, 2008, pp. 2045-2050.

Hasib et al., "Analysis of Common Radio Resource Management Scheme for End-to-End QoS Support in Multiservice Heterogeneous Wireless Networks," IEEE Transactions on Vehicular Technology, Jul. 2008, pp. 2426-2439.

Chang et al., "Cross-Layer-Based Adaptive Vertical Handoff With Predictive RSS in Heterogeneous Wireless Networks," IEEE Transactions on Vehicular Technology, Nov. 2008, pp. 3679-3692.

Gavrilovska et al., "Resource Management in Wireless Heterogeneous Networks (WHNs)," International Conference on Telecommunication in Modern Satellite, Cable, and Broadcasting Services, Oct. 7-9, 2009, pp. 97-106.

Atanasovski et al., "Efficient Resource Management in Future Heterogeneous Wireless Networks: the RIWCoS Approach," IEEE Military Communications Conference (MILCOM), Oct. 31, 2010-Nov. 3, 2010, pp. 2286-2291.

Sheng et al., "Resource Management Approach in Heterogeneous Wireless Access Networks Based on IEEE1900.4 Architecture," 2010 IEEE International Conference on Wireless Information Technology and Systems (ICWITS), Aug. 28, 2010-Sep. 3, 2010, pp. 1-4.

Pei et al., "Radio-Resource Management and Access-Control Mechanism Based on a Novel Economic Model in Heterogeneous Wireless Networks," IEEE Transactions on Vehicular Technology, Jul. 2010, pp. 3047-3056.

Saraee et al., "Cooperative Joint Radio Resource Management in Wireless Heterogeneous Networks," International Symposium on Computer Networks and Distributed Systems (CNDS), Feb. 23-24, 2011, pp. 111-115.

Hesham M. Elbadawy, "Optimal RAT Selection Algorithm through Common Radio Resource Management in Heterogeneous Wireless Networks," 28th National Radio Science Conference (NRSC), Apr. 26-28, 2011, pp. 1-9.

Aristomenopoulos et al., "Multiaccess Multicell Distributed Resource Management Framework in Heterogeneous Wireless Networks," IEEE Transactions on Vehicular Technology, Jul. 2012, pp. 2636-2650.

Tabrizi et al., "A Learning-based Network Selection Method in Heterogeneous Wireless Systems," IEEE Global Telecommunications Conference (GLOBECOM 2011), Dec. 5-9, 2011, pp. 1-5.

Tabrizi et al., "Dynamic Handoff Decision in Heterogeneous Wireless Systems: Q-Learning Approach," IEEE International Conference on Communications (ICC), Jun. 10-15, 2012, pp. 3217-3222.

Friedman et al., "On Power and Throughput Tradeoffs of WiFi and Bluetooth in Smartphones," IEEE Transactions on Mobile Computing, May 2012, pp. 1363-1376.

"Notice of Allowance of Taiwan Counterpart Application," dated Jan. 14, 2016, p. 1-p. 4, in which the listed references were cited.

"Office Action of China Counterpart Application," dated Mar. 14, 2018, pp. 1-6.

\* cited by examiner

BASE STATION AND SCHEDULING METHOD FOR WIRELESS NETWORK

CROSS-REFERENCE TO RELATED APPLICATION

This application claims the priority benefit of Taiwan application serial no. 103119779, filed on Jun. 6, 2014. The entirety of the above-mentioned patent application is hereby incorporated by reference herein and made a part of this specification.

BACKGROUND

Technical Field

The disclosure relates to a base station and a scheduling method for wireless network under a plurality of co-existed wireless network environments.

Related Art

Long term evolution (LTE) technology is a radio access technology (RAT) currently drawing extensive attention, and since the LTE technology has faster transmission speed and wider transmission bandwidth, it has a potential to become a wireless communication standard of a next generation.

Presently, popularity of user equipment (UE) such as mobile phones and tablet PCs has beyond a degree of one user one UE, and many people often carry more than one UE, which leads to a great burden for the wireless networks of a metropolitan area. Therefore, a concept of a heterogeneous multi-RAT network is developed. The so-called heterogeneous multi-RAT network refers to that the area where the UEs are located is covered by a plurality of heterogeneous networks, and the UEs can access various heterogeneous networks, for example, a LTE network and a wireless fidelity (WiFi) network. Construction cost of the WiFi network is far lower than that of the LTE network, so that the WiFi network can be used to mitigate the burden of the LTE network. For example, the static UEs or the UEs moved in a low speed may use the WiFi network without occupying a resource of the LTE network.

A dual-RAT mobile phone capable of supporting both of the LTE network and the WiFi network has been developed, and such mobile phone can be switched between the LTE network and the WiFi network according to factors such as whether signals of the two networks exist and signal quality thereof, etc. Such mobile phone only uses one selected network to transmit and receive signals without using the other unselected network to transmit and receive signals.

SUMMARY

The disclosure is related to a scheduling method for wireless network, which is adapted to a base station and user equipments to resolve a packet scheduling problem between heterogeneous networks after bandwidth integration, and resolve a problem of supporting quality of service (QoS) by a wireless local area network (WLAN). The disclosure also provides a base station executing the aforementioned scheduling method for wireless network.

The disclosure provides a base station including a transceiver and a processor. The transceiver transmits and receives wireless signals through a first wireless network and a second wireless network. The processor is coupled to the transceiver. When a plurality of user equipments (UEs) are connected to the base station and are in need of transmitting data through the first wireless network, the processor estimates a mean arrival rate of data to be transmitted through the first wireless network by the UEs through the second wireless network, determines a cluster size and divides the UEs into a plurality of clusters according to the mean arrival rate, and notifies each UE the number of the clusters and an identification (ID) of the cluster accommodating the UE through the second wireless network. The number of the UEs included in each cluster is not greater than the cluster size.

The disclosure provides a scheduling method for wireless network, which includes following steps. A mean arrival rate of data to be transmitted through a first wireless network by a plurality of user equipments (UEs) is estimated through a second wireless network when the UEs are connected to the base station and are in need of transmitting data through the first wireless network. A cluster size is determined and the UEs are divided into a plurality of clusters according to the mean arrival rate. The number of the clusters and the identification (ID) of the cluster accommodating the UE are notified to each UE through the second wireless network. The number of the UEs included in each cluster is not greater than the cluster size.

According to the above descriptions, by dividing the UEs into a plurality of clusters, contention of the UEs on an uplink channel of the first wireless network is decreased to shorten a transmission delay. Therefore, the embodiments of the disclosure resolve the packet scheduling problem of the heterogeneous networks, and the WLAN is capable of supporting the QoS.

In order to make the aforementioned and other features and advantages of the disclosure comprehensible, several exemplary embodiments accompanied with figures are described in detail below.

BRIEF DESCRIPTION OF THE DRAWINGS

The accompanying drawings are included to provide a further understanding of the disclosure, and are incorporated in and constitute a part of this specification. The drawings illustrate embodiments of the disclosure and, together with the description, serve to explain the principles of the disclosure.

DETAILED DESCRIPTION OF DISCLOSED EMBODIMENTS

Figure 1:
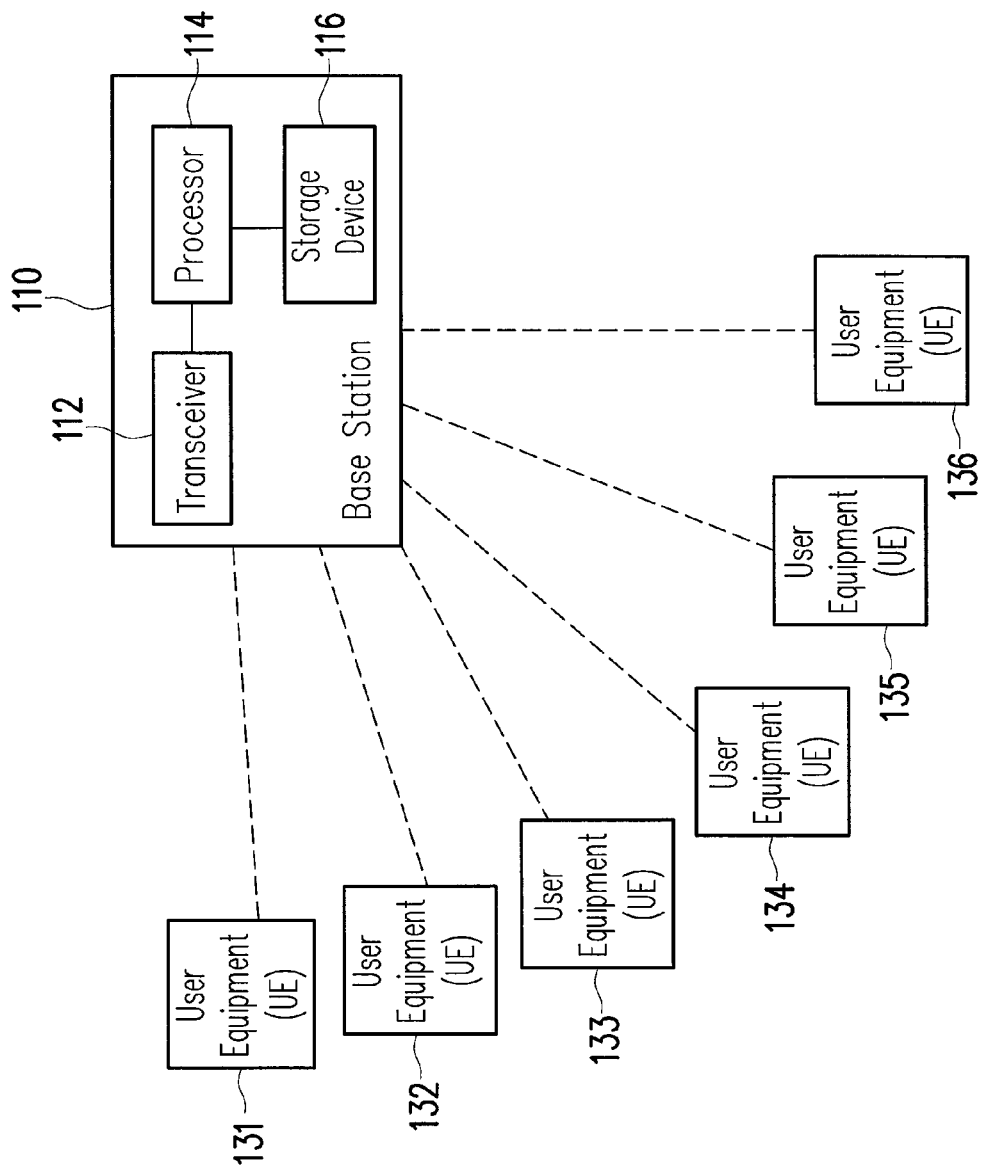
FIG. 1 is a schematic diagram of a base station according to an embodiment of the disclosure.

FIG. 1 is a schematic diagram of base station 110 according to an embodiment of the disclosure. The base station 110 includes a transceiver 112, a processor 114 and a storage device 116. The processor 114 is coupled to the transceiver 112 and the storage device 116. The processor 114 executes a wireless communication function of the base station 110. The transceiver 112 can transmit and receive wireless signals through a plurality of wireless networks, for example, a long term evolution (LTE) network and a wireless fidelity (WiFi) network. In this case, the base station 110 is equivalent to a combination of an evolved node B (which is referred to as eNB) of the LTE network and an access point (AP) of the WiFi network. In the following descriptions, the wireless signal sent by the processor 114 are all transmitted to the wireless network through the transceiver 112, and the wireless signals received by the processor 114 are all received from the wireless network through the transceiver 112.

User equipments (UEs) 131-136 all have a function of accessing a plurality of wireless networks, and can access the wireless networks through the base station 110, for example, the aforementioned LTE network and WiFi network. In FIG. 1, although six UEs 131-136 are illustrated, the number of the UEs served by the base station 110 is not limited by the disclosure.

Figure 2:
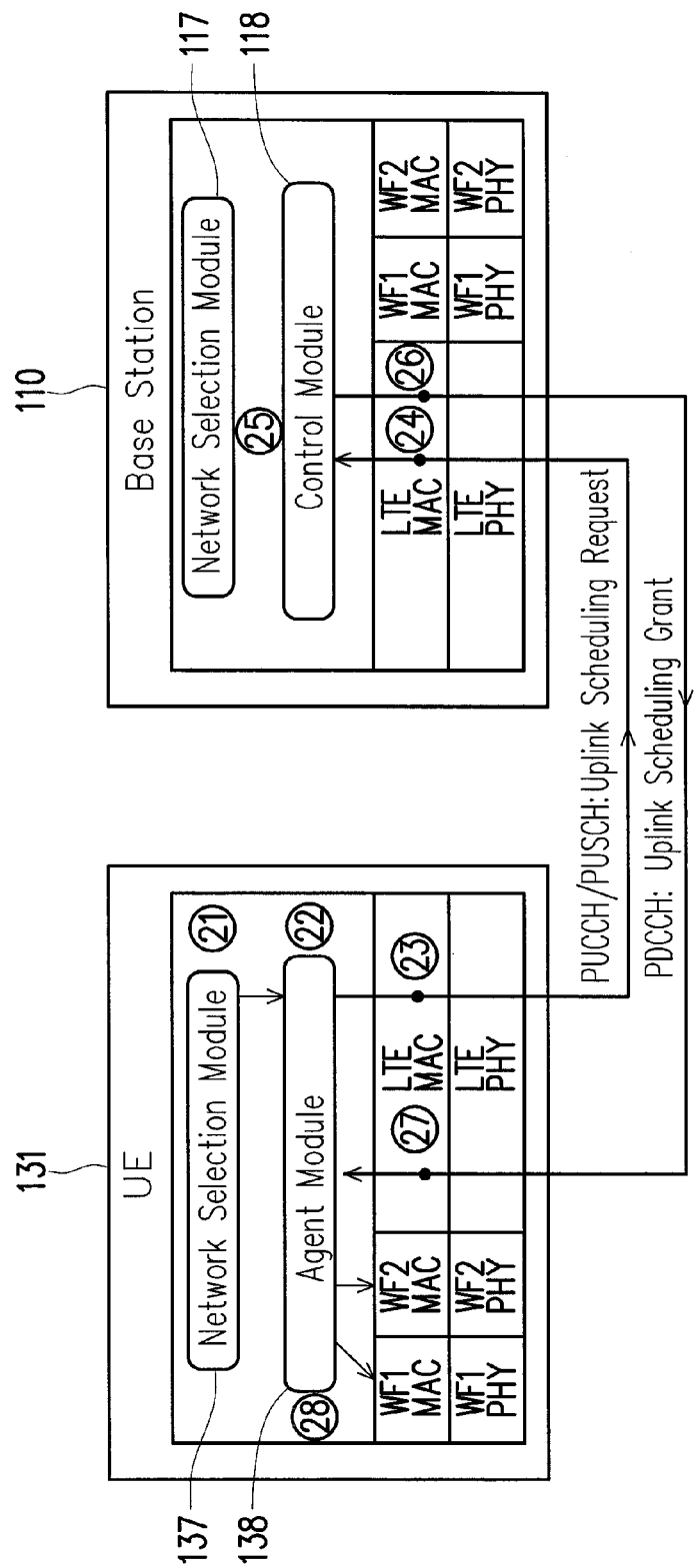
FIG. 2 is a schematic diagram of an uplink scheduling between a base station and a user equipment (UE) according to an embodiment of the disclosure.
Figure 3:
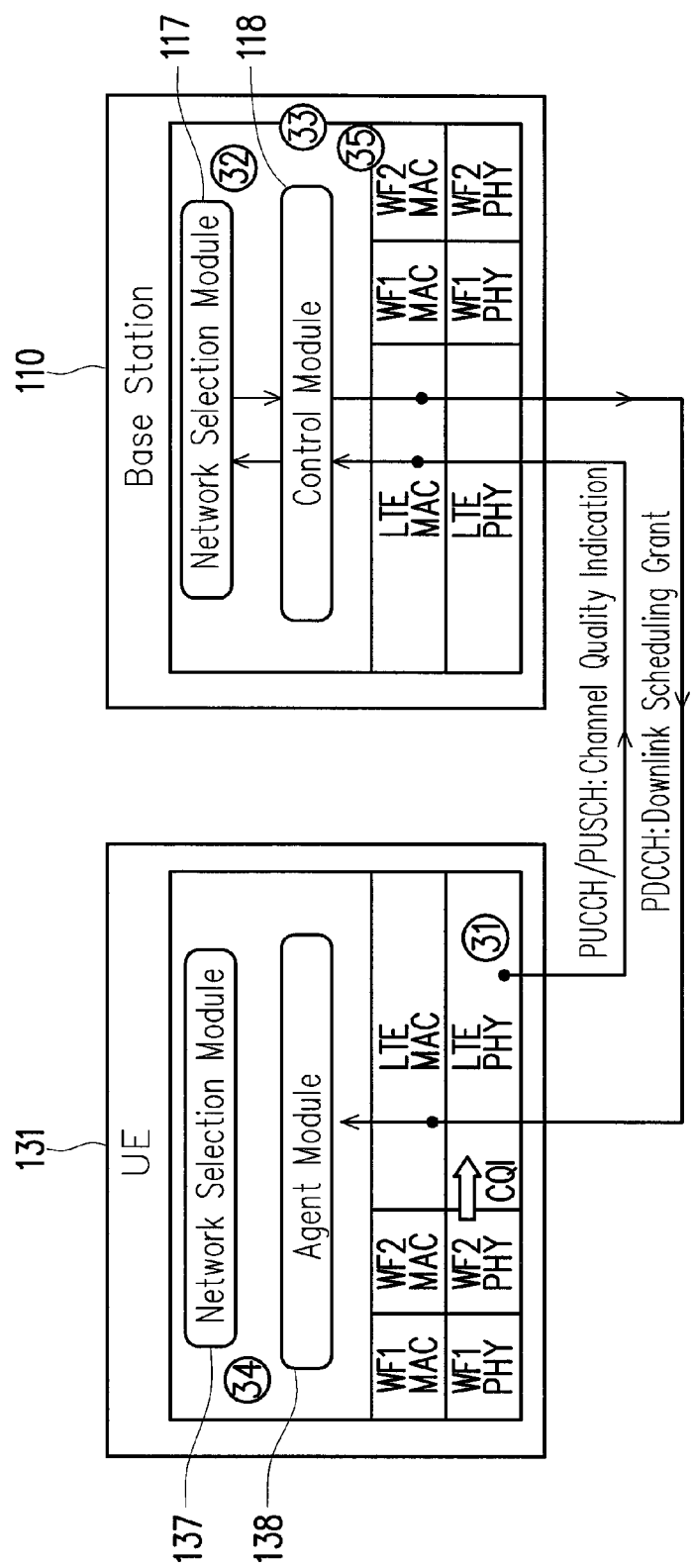
FIG. 3 is a schematic diagram of a downlink scheduling between a base station and a UE according to an embodiment of the disclosure.

FIG. 2 is a schematic diagram of an uplink scheduling between the base station 110 and the UE 131 according to an embodiment of the disclosure. FIG. 3 is a schematic diagram of a downlink scheduling between the base station 110 and the UE 131 according to an embodiment of the disclosure. In the present embodiment, although signal transmission between the base station 110 and the UE 131 is taken as an example for description, the UE 131 can be replaced by any UE. Both of the base station 110 and the UE 131 have the function of accessing the LTE network and the WiFi network, and both of the base station 110 and the UE 131 can access two WiFi networks of different frequency bands. FIG. 2 illustrates the uplink scheduling of the WiFi network between the base station 110 and the UE 131, and FIG. 3 illustrates the downlink scheduling of the WiFi network between the base station 110 and the UE 131. Scheduling of the LTE network between the base station 110 and the UE 131 is complied with original LTE specification.

The base station 110 and the UE 131 respectively execute a plurality of software modules. The software modules of the base station 110 include a network selection module 117 and a control module 118. The network selection module 117 can select one of, two of or three of the LTE network and the two WiFi networks according to factors of network accessibility, network channel quality or network load degree, etc., so as to transmit data to the UE 131. The network selection module 117 may select different networks to transmit data for different applications or different services. The network used by each of the applications or services is not fixed, which can be switched according to an actual requirement. The control module 118 controls uplink scheduling and downlink scheduling of the WiFi network of the base station 110.

The software modules of the base station 110 also include driving programs of the aforementioned three networks. A driving program of a media access control sub-layer of the LTE network is denoted by LTE MAC in FIG. 2 and FIG. 3, and a driving program of a physical layer of the LTE network is denoted by LTE PHY in FIG. 2 and FIG. 3. A driving program of a media access control sub-layer of the first WiFi network is denoted by WF1 MAC in FIG. 2 and FIG. 3, and a driving program of a physical layer of the first WiFi network is denoted by WF1 PHY in FIG. 2 and FIG. 3. A driving program of a media access control sub-layer of the second WiFi network is denoted by WF2 MAC in FIG. 2 and FIG. 3, and a driving program of a physical layer of the second WiFi network is denoted by WF2 PHY in FIG. 2 and FIG. 3. The aforementioned software modules of the base station 110 are all executed by the processor 114.

The software modules of the UE 131 include a network selection module 137 and an agent module 138. The network selection module 137 can select one of, two of or three of the LTE network and the two WiFi networks according to factors of network accessibility, network channel quality or network load degree, etc., so as to transmit data to the base station 110. The network selection module 137 may select different networks to transmit data for different applications or different services. The network used by each of the applications or services is not fixed, which can be switched according to an actual requirement. The agent module 138 controls uplink scheduling and downlink scheduling of the WiFi network of the UE 131. The software modules of the UE 131 also include driving programs of the aforementioned three networks.

The uplink scheduling of the WiFi network of FIG. 2 includes eight steps 21-28. In the step 21, the network selection module 137 selects a network used for transmitting data. It is assumed that the selected network is the first WiFi network WF1. In the step 22, the agent module 138 generates an uplink scheduling request (USR). The USR includes an arrival rate (AR) of data to be transmitted through the first WiFi network WF1 by the UE 131 during a previous predetermined time period, i.e. an average obtained by dividing a total amount of data arriving the WF1 driving program of the UE 131 and waiting for transmission during the predetermined time period by a time length of the predetermined time period. The arrival rate can be represented by bits per second or frames per second.

In the step 23, the LTE driving program of the UE 131 transmits the USR by using a physical uplink control channel (PUCCH) or a physical uplink share channel (PUSCH) of the LTE network. The USR represents that the UE 131 has data required to be transmitted through the first WiFi network WF1, and requires the base station 110 to schedule the data. In the step 24, the LTE driving program of the base station 110 receives the USR, and transmits the USR to the control module 118.

In the step 25, the control module 118 obtains the average of the arrival rate of data to be transmitted through the first WiFi network WF1 by each UE connected to the base station from the USR, and calculates a sum of the averages of the UEs to obtain a mean arrival rate (MAR) of the data to be transmitted through the first WiFi network WF1 by the UE. The control module 118 determines an optimal cluster size of the UE according to the MAR.

In the step 26, the processor 114 divides the UEs into a plurality of clusters according to the cluster size, and the LTE driving program of the base station 110 sends an uplink scheduling grant (USG) to each of the UEs requiring to transmit data through the first WiFi network WF1 by using a physical downlink control channel (PDCCH) of the LTE network. The USG includes the number of the clusters and an identification (ID) of the cluster accommodating the UE. In the step 27, the LTE driving program of the UE 131 receives the USG, and transmits the number of the clusters and the cluster ID to the agent module 138. In the step 28, the UE 131 transmits data based on the cluster accommodating the UE. A function of the cluster is described in detail later.

The downlink scheduling of the WiFi network of FIG. 3 includes five steps 31-35. In the step 31, the LTE driving program of the UE 131 calculates a channel quality indication (CQI) of the LTE network according to a downlink signal of the LTE network, the WiFi driving program of the UE 131 calculates CQIs of the WiFi networks WF1 and WF2 according to downlink signals of the WiFi networks WF1 and WF2, and the LTE driving program of the UE 131 collects the CQIs of the LTE network and the two WiFi networks, and transmits the CQIs of the three networks to the network selection module 117 of the base station 110 by using the PUCCH or PUSCH of the LTE network. The network selection module 117 can estimate the channel quality of the three networks according to the CQIs.

In the step 32, the network selection module 117 selects at least one of the LTE network and the two WiFi networks for transmitting data to the UE. When the network selection module 117 determines to use the WiFi network to transmit data to the UE 131, in the step 33, the control module 118 sends a downlink scheduling grant (DSG) through the PDCCH of the LTE network. The DSG notifies the UE 131 the network selected for transmitting data by the base station 110. In the step 34, the agent module 138 receives the DSG, and notifies the base station 110 that the driving program of the selected WiFi network is ready to receive data through the WiFi network. In the step 35, the control module 118 of the base station 110 transmits data to the UE 131 through the selected WiFi network.

In the embodiment of FIG. 2 and FIG. 3, the LTE network is used to transmit control information of WiFi network scheduling, and the WiFi network is unnecessary to transmit its own scheduling control information.

According to the WiFi standard, if the UE 131 is required to transmit data, the UE 131 has to contend the uplink channel with the other UEs, and such contention mechanism is based on a carrier sense multiple access with collision avoidance (CSMA/CA) technique and a backoff countdown counter (BCC). Each of the UEs has a BCC for the first WiFi network WF1 and the second WiFi network WF2, and the BCC is generally a variable maintained by software or firmware. The BCC starts to count down from an initial value determined by a random number, and when the BCC counts down to the zero, the UE tries to send data. Now, if collision occurs, the UE sets a greater initial value for the BCC by using the random number to restart the countdown.

Figure 4:
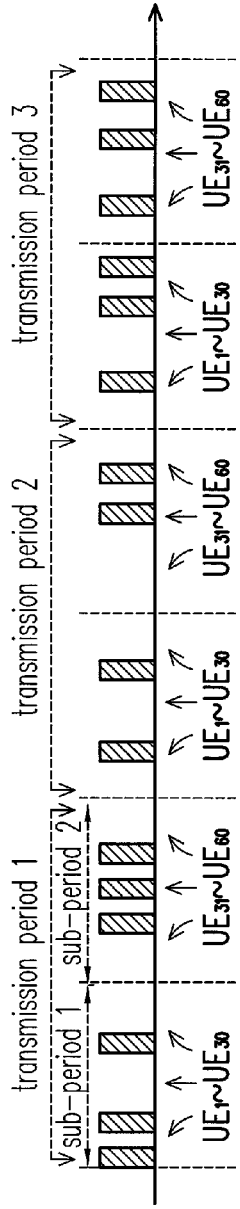
FIG. 4, FIG. 5 and FIG. 6 are schematic diagrams of transmission periods and sub-periods of a wireless network according to different embodiments of the disclosure.

The cluster dividing of the step 26 is in order to let the UEs that require the WiFi network to transmit data to contend the uplink channel in cluster, so as to avoid too frequent collision to decrease a whole data throughput. FIG. 4 is a schematic diagram of transmission periods and sub-periods of the WiFi network according to an embodiment of the disclosure. It is assumed that in the UEs connected to the base station 110, 60 UEs $UE_1$-$UE_{60}$ require to use a same WiFi network to transmit data, and in the step 26, the processor 114 of the base station 110 divides the 60 UEs into two clusters, each transmission period of the WiFi network can be divided into two sub-periods, and the sub-periods and the clusters have a one-to-one corresponding relationship. The UEs $UE_1$-$UE_{30}$ are allocated to a first cluster, and the UEs $UE_{31}$-$UE_{60}$ are allocated to a second cluster.

Figure 5:
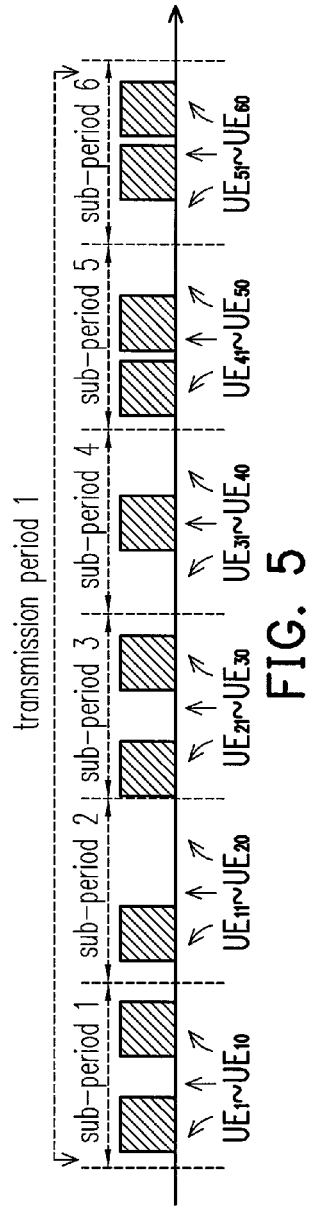

FIG. 5 is a schematic diagram of transmission periods and sub-periods of the WiFi network according to another embodiment of the disclosure. In the present embodiment, the processor 114 divides the 60 UEs into six clusters in the step 26, so that each transmission period of the WiFi network can be divided into six sub-periods. The UEs $UE_1$-$UE_{10}$ are allocated to a first cluster, the UEs $UE_{11}$-$UE_{20}$ are allocated to a second cluster, and the UEs $UE_{21}$-$UE_{30}$ are allocated to a third cluster, and the others can be deduced by analogy.

Figure 6:
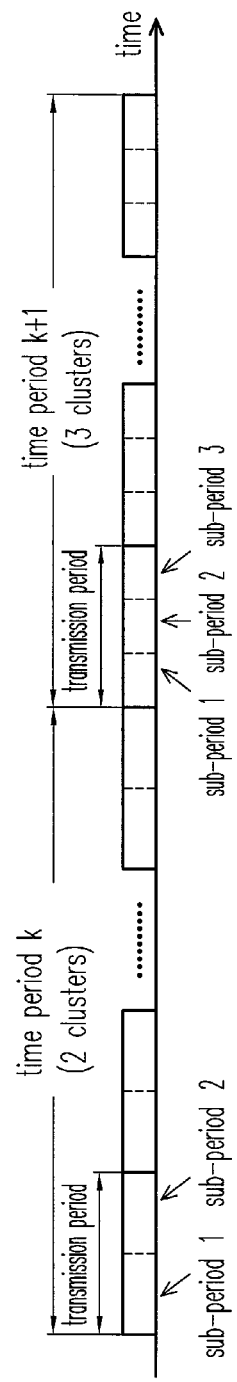

Regarding clustering of the UEs, a time period of a predetermined length is taken as a time unit, and the processor 114 recalculates an optimal cluster size in each time period, and re-divides the UEs according to the new cluster size. Each time period may include a plurality of transmission periods. FIG. 6 is a schematic diagram illustrating time periods, transmission periods and sub-periods according to an embodiment of the disclosure. As shown in FIG. 6, the UEs are divided into two clusters during a time period k, so that each of the transmission periods in the time period k is divided into two sub-periods. The UEs are divided into three clusters during a time period k+1, so that each of the transmission periods in the time period k+1 is divided into three sub-periods.

Figure 7:
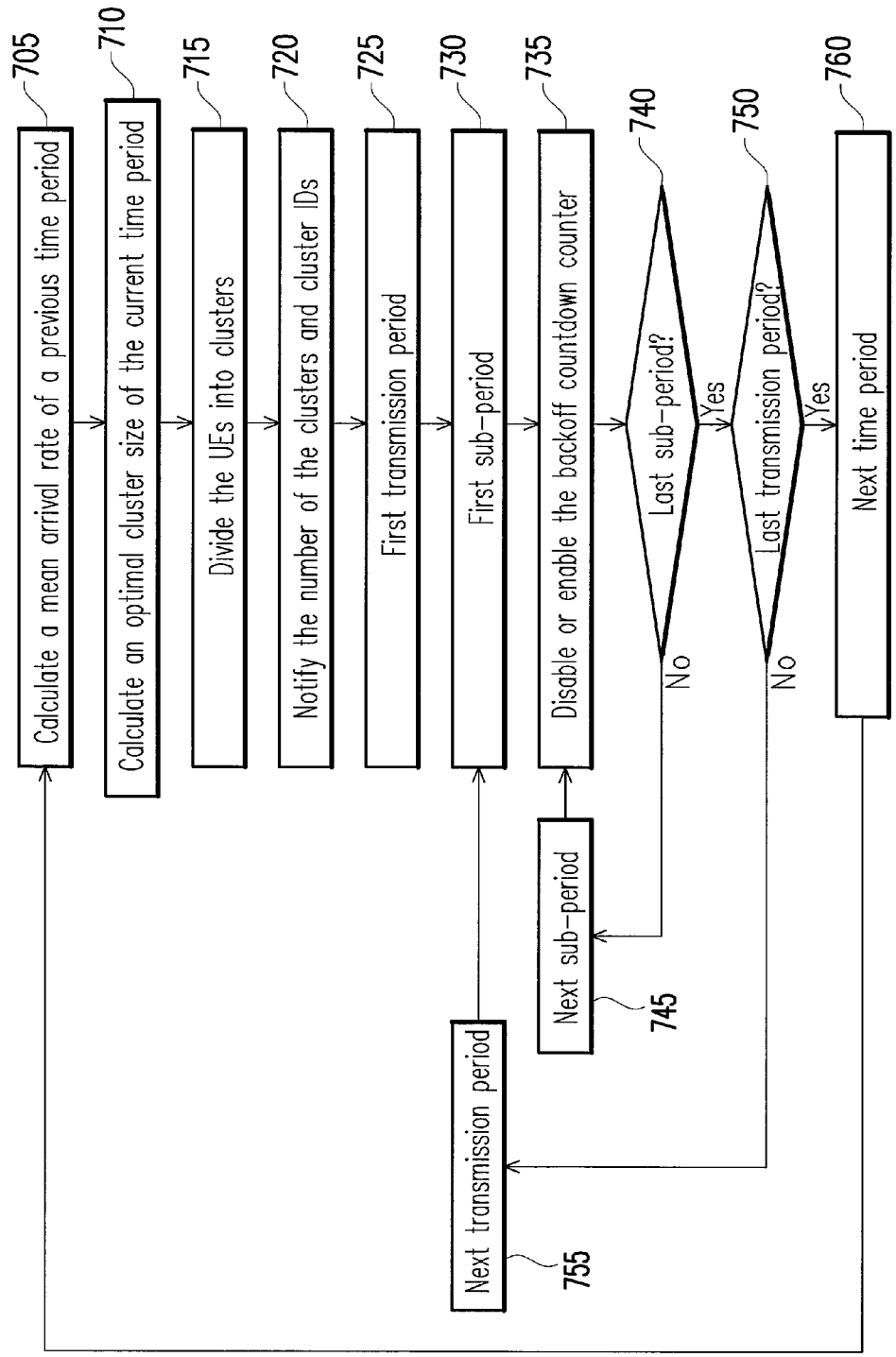
FIG. 7 is a flowchart illustrating a scheduling method for wireless network according to an embodiment of the disclosure.

FIG. 7 is a flowchart illustrating a scheduling method for wireless network according to an embodiment of the disclosure. The method can be executed by the base station 110 and the UEs served by the base station 110. When a plurality of UEs are connected to the base station 110 and require to transmit data through a same WiFi network, the processor 114 starts to execute the scheduling method for wireless network of the present embodiment.

First, in step 705, the processor 114 obtains an average of an arrival rate of data to be transmitted through the WiFi network by each UE during a previous time period through the LTE network, and calculates a sum of the averages to obtain a mean arrival rate (MAR) of the data to be transmitted through the WiFi network by the UE. In step 710, the processor 114 determines an optimal cluster size $N_{OP}^C$ according to the MAR. The storage device 116 of the base station 110 may store a function $\psi_{OP}$ in advance. The processor 114 may input the MAR to the function $\psi_{OP}$, and sets the optimal cluster size $N_{OP}^C$ to be equal to an output of the function $\psi_{OP}$.

In step 715, the processor 114 calculates a cluster number $N_M$, and divides the UEs into $N_M$ clusters. If a total number $N_T$ of the UEs is a multiple of the optimal cluster size $N_{OP}^C$, the cluster number $N_M$ is equal to $N_T/N_{OP}^C$, otherwise, the cluster number $N_M$ is equal to an integer part of $N_T/N_{OP}^C$ plus one. Therefore, the number of the UEs included in each of the clusters does not exceed the optimal cluster size $N_{OP}^C$.

In step 720, the processor 114 of the base station 110 notifies each UE the cluster number $N_M$ and the identification (ID) of the cluster accommodating the UE through the LTE network. Referring to FIG. 6, regarding each of the UEs, each time period and a length, a start time and an end time of each transmission period are all known. Each cluster corresponds to a sub-period. Therefore, after each of the UEs receives the cluster number $N_M$ and the identification (ID) of the cluster accommodating the UE from the base station 110, the UE can deduce the start time and the end time of the corresponding sub-period.

In step 725, the base station 110 and the UE enter a first transmission period. In step 730, the base station 110 and the UE enter a first sub-period of the current first transmission period. In step 735, each of the UEs disables the BCC outside the sub-period corresponding to the cluster accommodating the UE, and each of the UEs enables the BCC within the sub-period corresponding to the cluster accommodating the UE. Therefore, in each of the transmission periods, the BCC of each UE is disabled during the other sub-periods outside the sub-period corresponding to the UE, and does not perform the countdown, and the BCC starts to perform the countdown during the sub-period corresponding to the UE. Such cluster mechanism can control the number of the UEs simultaneously contending the uplink channel to avoid collision, so as to improve data transmission efficiency of the UE.

If a UE does not complete data transmission during the corresponding sub-period due to too much data to be transmitted, the UE can continually transmit the data in the subsequent sub-period. Namely, once the BCC of one UE is activated during the corresponding sub-period, the backoff countdown and data transmission of the UE are totally performed according to the WiFi standard. If one UE starts to transmit data, the data transmission is not influenced by the subsequent sub-periods.

In step 740, the base station 110 and the UE check whether the current sub-period is the last sub-period of the current transmission period. If not, in step 745, the base station 110 and the UE enter a next sub-period. If the current sub-period is the last sub-period of the current transmission period, in step 750, the base station 110 and the UE check whether the current transmission period is the last transmission period of the current time period. If not, in step 755, the base station 110 and the UE enter a next transmission period. If the current transmission period is the last transmission period of the current time period, in step 760, the base station 110 and the UE enter a next time period, and the flow returns to the step 705.

Figure 8:
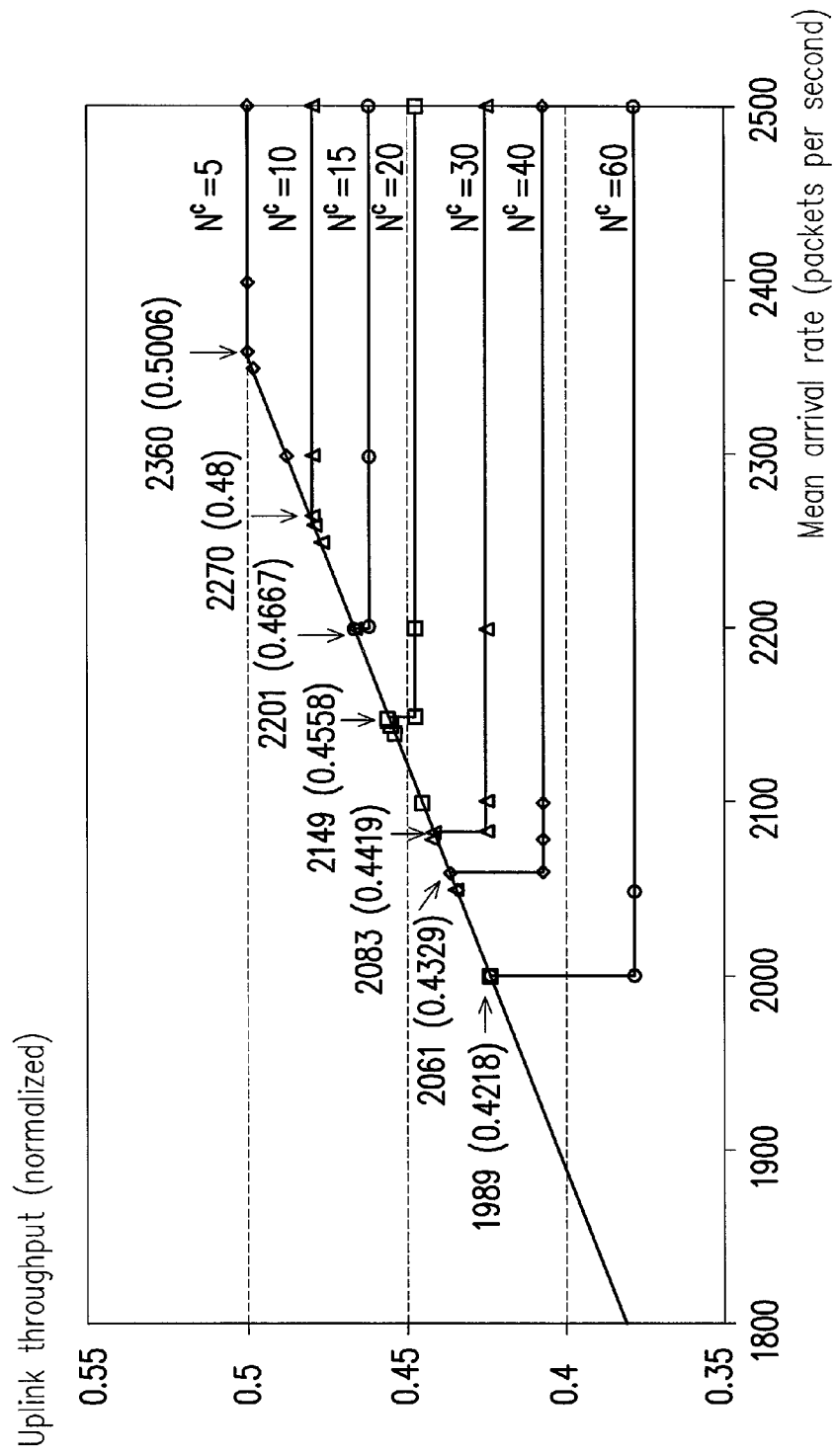
FIG. 8 and FIG. 9 are schematic diagrams of uplink transmission simulation according to different embodiments of the disclosure.

The step 710 of calculating the optimal cluster size $N_{OP}^C$ is described in detail below. First, uplink transmission simulation of the UE is performed according to a data traffic model of the network. For example, FIG. 8 is a schematic diagram of uplink transmission simulation of a UE based on a Poisson traffic model according to an embodiment of the disclosure. The so-called Poisson traffic model is a network data traffic model established according to a Poisson distribution. A horizontal axis of FIG. 8 represents the aforementioned MAR of the UE, and a vertical axis of FIG. 8 represents a normalized uplink throughput of the UE, i.e. a ratio between actual uplink data throughputs of all of the UEs and a maximum uplink bandwidth of the WiFi network of the UEs in the uplink transmission simulation.

FIG. 8 illustrates a plurality of function curves, and each of the function curves corresponding to a different cluster size $N^C$. $N^C$ is the cluster size according to which the UEs are clustered in the simulation. Each of the function curves starts to extend towards upper right from a same point at the lower left, and becomes a horizontal line after reaching a saturation point. The saturation point and the horizontal line may or may not have a fall there between. For example, coordinates of the saturation point corresponding to the cluster size $N^C$ of 60 is (1989, 0.4218), coordinates of the saturation point corresponding to the cluster size $N^C$ of 40 is (2061, 0.4329), and deduced by analogy. The saturation points corresponding to the cluster sizes $N^C$ of 5 and 10 and the horizontal line have not fall there between, and the saturation points corresponding to the cluster sizes $N^C$ of 15 to 60 and the horizontal line have falls there between.

Regardless of the cluster size, before the MAR reaches the saturation point, the uplink throughput is proportional to the MAR. However, when after the MAR reaches the saturation point, the uplink throughput is not increased, and is even decreased, and a corresponding transmission delay is increased. A reason thereof is that after the MAR reaches the saturation point, the contention and collision consume too much time of the UE, such that the UE has not time to transmit data. The smaller the cluster is, the higher the normalized uplink throughput is.

According to FIG. 8, it is known that according to the uplink transmission simulation of the Poisson traffic model, a function $\phi_1$ can be obtained, and the function $\phi_1$ is a set of all of the function curves of FIG. 8 corresponding to various cluster sizes $N^C$. Therefore, the function $\phi_1$ can correspond the cluster sizes $N^C$ and the MAR to the uplink throughput of the UE.

Figure 9:
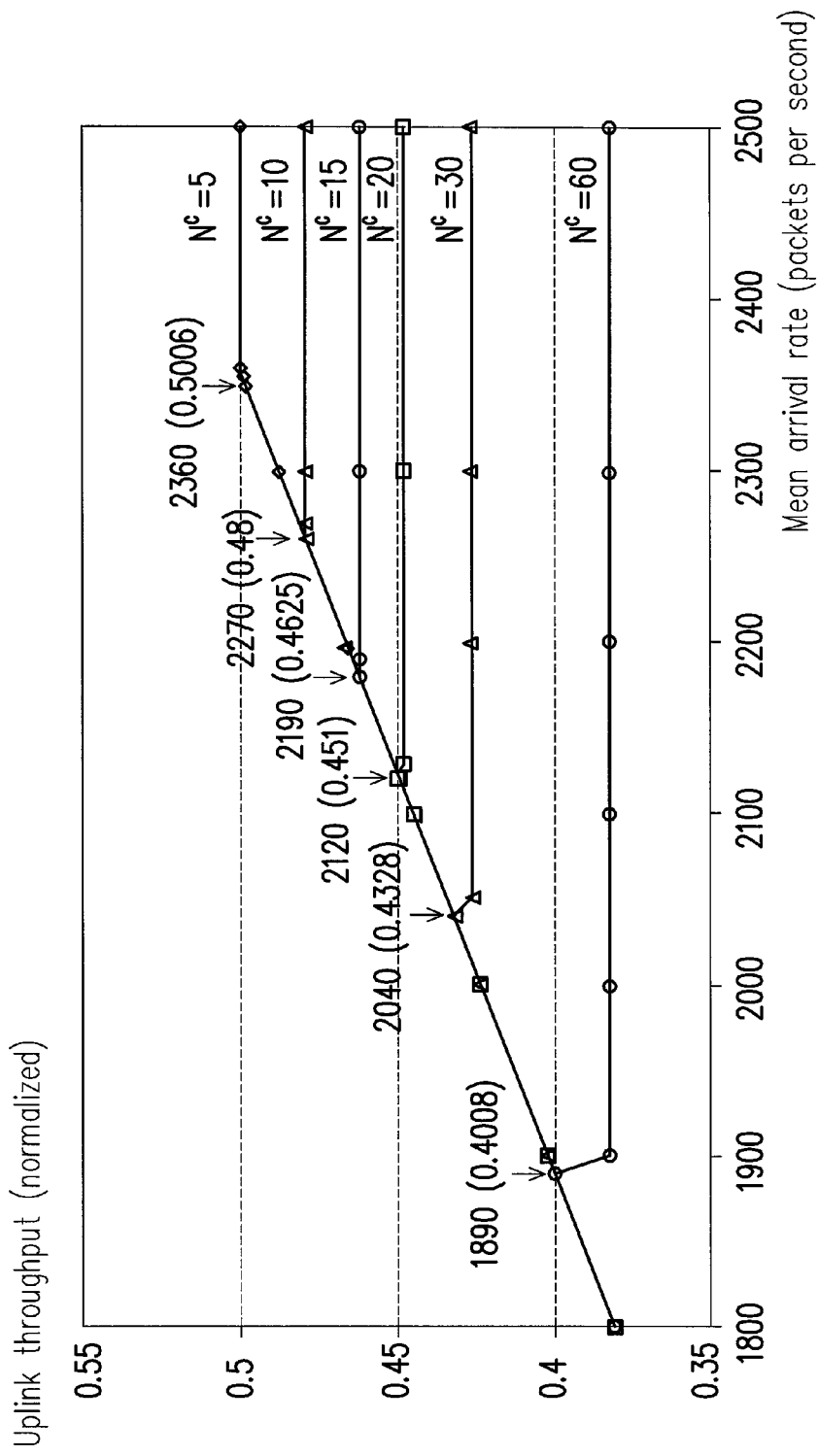

FIG. 9 is a schematic diagram of uplink transmission simulation of a UE based on a bursty traffic model according to an embodiment of the disclosure. FIG. 9 and FIG. 8 have a same format. According to FIG. 9, it is known that according to the uplink transmission simulation of the bursty traffic model, a function $\phi_2$ can be obtained, and the function $\phi_2$ is a set of all of the function curves of FIG. 9 corresponding to various cluster sizes $N^C$. Therefore, the function $\phi_2$ can correspond the cluster sizes $N^C$ and the MAR to the uplink throughput of the UE.

Figure 10:
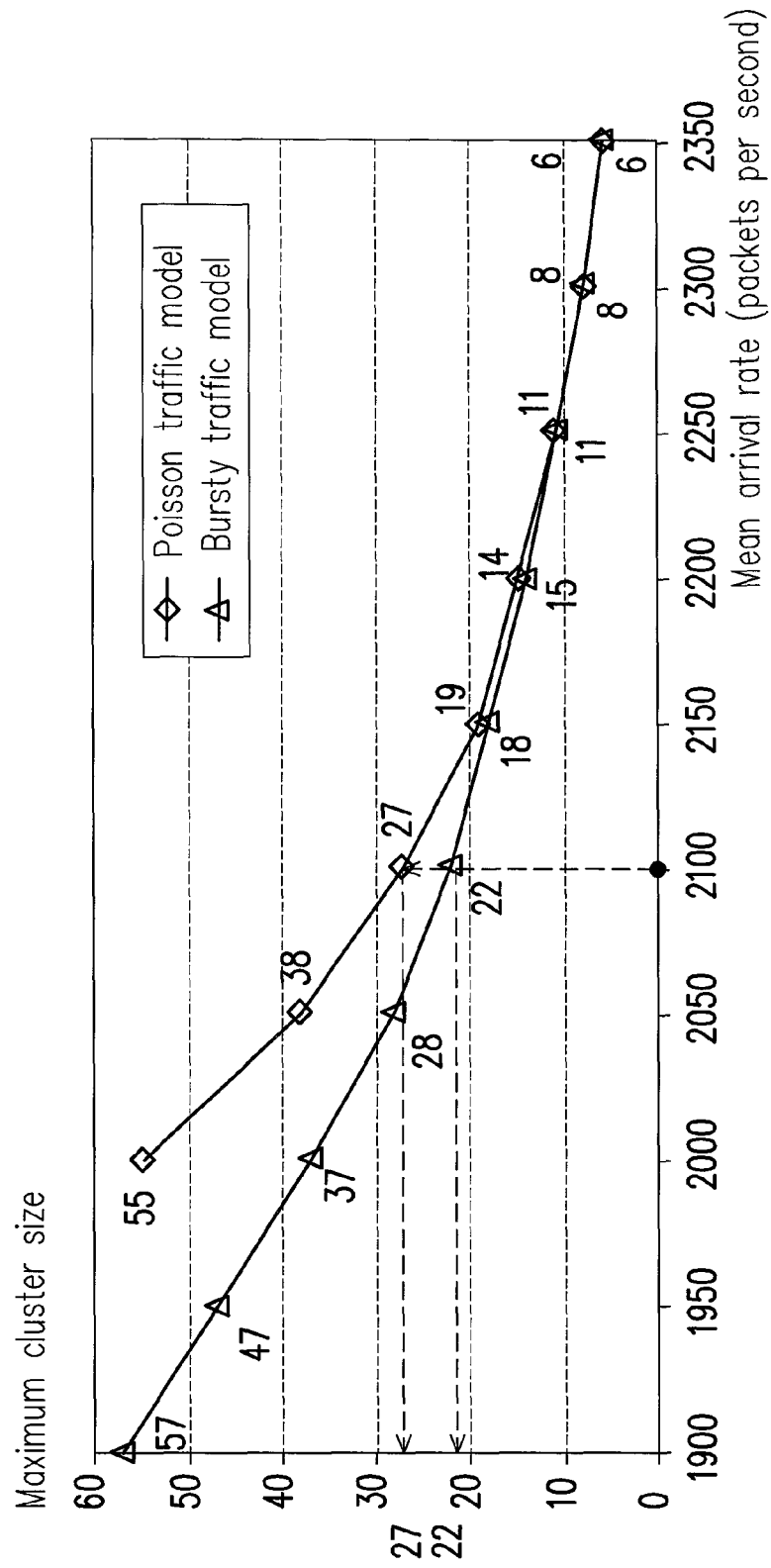
FIG. 10 is a schematic diagram of functions corresponding mean arrival rates (MARs) to cluster sizes according to an embodiment of the disclosure.

FIG. 10 is a schematic diagram of functions $\psi_1$ and $\psi_2$ according to an embodiment of the disclosure. The upper function $\psi_1$ of FIG. 10 is generated according to the function $\phi_1$ of FIG. 8, and the lower function $\psi_2$ of FIG. 10 is generated according to the function $\phi_2$ of FIG. 9. The functions $\psi_1$ and $\psi_2$ can correspond the MAR of data to be transmitted through the WiFi network by the UE to the cluster size.

Taking the functions $\psi_1$ and $\phi_1$ as an example, if one MAR is input to the function $\psi_1$, an output of the function $\psi_1$ is the maximum value $N_{max}^C$ the cluster size $N^C$ corresponding to the maximum uplink throughput corresponding to the MAR in the function $\phi_1$. For example, according to the function $\psi_1$, the maximum cluster size $N_{max}^C$ corresponding to the MAR of 2100 is 27. The relationship between the functions $\psi_2$ and $\phi_2$ is similar to the relationship between the functions $\psi_1$ and $\phi_1$. For example, according to the function $\psi_2$, the maximum cluster size $N_{max}^C$ corresponding to the MAR of 2100 is 22.

FIG. 10 illustrates two $\psi_1$ and $\psi_2$ generated according to simulation of two traffic models, and in another embodiment, at least one function $\psi_i$ is generated according to any number of the traffic models, where i is any positive integer. A function $\psi_{OP}$ used for generating the optimal cluster size $N_{OP}^C$ and stored in the storage device 116 of the base station 110 can be defined as a minimum value of all of the functions $\psi_i$. Taking FIG. 10 as an example, by inputting the MAR of 2100 to the function $\psi_{OP}$, the optimal cluster size $N_{OP}^C$ output by the function $\psi_{OP}$ is the minimum one of the output values 27 and 22 of the functions $\psi_1$ and $\psi_2$. Such optimal cluster size $N_{OP}^C$ can achieve the maximum uplink throughput, and therefore achieve the minimum output delay, such that the WiFi network is capable of supporting quality of service (QoS).

In the aforementioned embodiments, the LTE network and the WiFi network are taken as an example for descriptions, where the LTE network is a cellular radio access network (CRAN), and the WiFi network is a wireless local area network (WLAN). In another embodiment, the base station 110 and the UEs may simultaneously access any type and any number of the WLANs and any CRAN. Besides the aforementioned LTE network, the CRAN may also include a 3G network, a worldwide interoperability for microwave access (WiMAX) network and a LTE advanced network. Certainly, each type of the WLAN and the CRAN applies a different radio access technology (RAT). The aforementioned scheduling method for wireless network is adapted to any wireless network required to contend the uplink bandwidth in a collision and backoff manner.

In summary, according to the embodiments of the disclosure, only the self contention mechanism of the wireless network is used without modifying a wireless network protocol, which is easy to be accepted by equipment manufactures. In the embodiment of the disclosure, the number of the UEs simultaneously contending the uplink channel is controlled according to the cluster mechanism, so as to decrease collision probability and control the QoS.

It will be apparent to those skilled in the art that various modifications and variations can be made to the structure of the disclosure without departing from the scope or spirit of the disclosure. In view of the foregoing, it is intended that the disclosure cover modifications and variations of this disclosure provided they fall within the scope of the following claims and their equivalents.

What is claimed is:

1. A base station, comprising:
a transceiver, transmitting and receiving wireless signals by accessing a first wireless network and by accessing a second wireless network; and
a processor, coupled to the transceiver, wherein when a plurality of user equipments are connected to the base station and are in need of transmitting data through the first wireless network, the processor accesses the second wireless network to estimate a mean arrival rate of data to be transmitted through the first wireless network by the user equipments, determines a cluster size of the user equipments and divides the user equipments into a plurality of clusters according to the mean arrival rate, and notifies each said user equipment a number of the clusters and an identification of the cluster accommodating the user equipment through the second wireless network, wherein a number of the user equipments included in each said cluster is not greater than the cluster size of the user equipments; and
a storage device, coupled to the processor, and storing a first function, wherein the processor inputs the mean arrival rate to the first function and sets the cluster size of the user equipments to be equal to an output of the first function, wherein the first function is defined as a minimum value of at least one second function, and each of the second functions is generated according to an uplink transmission simulation of the user equipments, wherein
each of the second functions is generated according to a third function;
the third function corresponds the cluster size of the user equipments and the mean arrival rate to uplink throughputs of the user equipments; and
the second function corresponds the mean arrival rate to a maximum cluster size of the user equipments, wherein the maximum cluster size of the user equipments corresponds to a maximum uplink throughput which corresponds to the mean arrival rate in the third function.

2. The base station as claimed in claim 1, wherein the first wireless network and the second wireless network use different wireless access technologies, and the first wireless network is a wireless local area network, and the second wireless network is a cellular radio access network.

3. The base station as claimed in claim 1, wherein the processor obtains an average of an arrival rate of data to be transmitted by accessing the first wireless network by each said user equipment during a predetermined time period by accessing the second wireless network, and calculates the mean arrival rate, wherein the mean arrival rate is a sum of the averages of the user equipments.

4. The base station as claimed in claim 1, wherein each of the user equipments contends an uplink channel of the first wireless network according to a backoff countdown counter, and each of the user equipments determines when to disable the backoff countdown counter and when to enable the backoff countdown counter according to the number of the clusters and the identification of the cluster accommodating the user equipment that are received from the base station.

5. The base station as claimed in claim 4, wherein each transmission period of the first wireless network is divided into a plurality of sub-periods, each of the clusters corresponds to one of the sub-periods, and in each of the transmission periods, each of the user equipments disables the backoff countdown counter outside the sub-period corresponding to the cluster accommodating the user equipment and enables the backoff countdown counter within the sub-period.

6. The base station as claimed in claim 1, wherein the processor selects the first wireless network and/or the second wireless network to transmit data to the users equipments, and when the processor determines to use the first wireless network to transmit data to one of the user equipments, the processor notifies the user equipment to prepare receiving data through the first wireless network via the second wireless network, and transmits data to the user equipment through the first wireless network.

7. A scheduling method for wireless network, executed by a base station, and comprising:
accessing a second wireless network to estimate a mean arrival rate of data to be transmitted through a first wireless network by a plurality of user equipments when the user equipments are connected to the base station and are in need of transmitting data through the first wireless network;
determining a cluster size of the user equipments and dividing the user equipments into a plurality of clusters according to the mean arrival rate, comprising:
inputting the mean arrival rate to a first function and setting the cluster size of the user equipments to be equal to an output of the first function, wherein the first function is defined as a minimum value of at least one second function, and each of the second functions is generated according to an uplink transmission simulation of the user equipments; and
notifying each said user equipment a number of the clusters and an identification of the cluster accommodating the user equipment through the second wireless network, wherein a number of the user equipments included in each said cluster is not greater than the cluster size of the user equipments, wherein
each of the second functions is generated according to a third function;
the third function corresponds the cluster size of the user equipments and the mean arrival rate to uplink throughputs of the user equipments; and
the second function corresponds the mean arrival rate to a maximum cluster size of the user equipments, wherein the maximum cluster size of the user equipment corresponds to a maximum uplink throughput which corresponds to the mean arrival rate in the third function.

8. The scheduling method for wireless network as claimed in claim 7, wherein the first wireless network and the second wireless network use different wireless access technologies, and the first wireless network is a wireless local area network, and the second wireless network is a cellular radio access network.

9. The scheduling method for wireless network as claimed in claim 7, wherein the step of estimating the mean arrival rate comprises:
obtaining an average of an arrival rate of data to be transmitted by accessing the first wireless network by each said user equipment during a predetermined time period by accessing the second wireless network; and
calculating the mean arrival rate, wherein the mean arrival rate is a sum of the averages of the user equipments.

10. The scheduling method for wireless network as claimed in claim 7, wherein each of the user equipments contends an uplink channel of the first wireless network according to a backoff countdown counter, and each of the user equipments determines when to disable the backoff countdown counter and when to enable the backoff countdown counter according to the number of the clusters and the identification of the cluster accommodating the user equipment that are received from the base station.

11. The scheduling method for wireless network as claimed in claim 10, wherein each transmission period of the first wireless network is divided into a plurality of sub-periods, each of the clusters corresponds to one of the sub-periods, and in each of the transmission periods, each of the user equipments disables the backoff countdown counter outside the sub-period corresponding to the cluster accommodating the user equipment and enables the backoff countdown counter within the sub-period.

12. The scheduling method for wireless network as claimed in claim 7, further comprising:
selecting the first wireless network and/or the second wireless network to transmit data to the users equipments; and
notifying the user equipment to prepare receiving data through the first wireless network via the second wireless network when determining to use the first wireless network to transmit data to one of the user equipments, and transmitting data to the user equipment through the first wireless network.

* * * * *